UNITED STATES PATENT OFFICE.

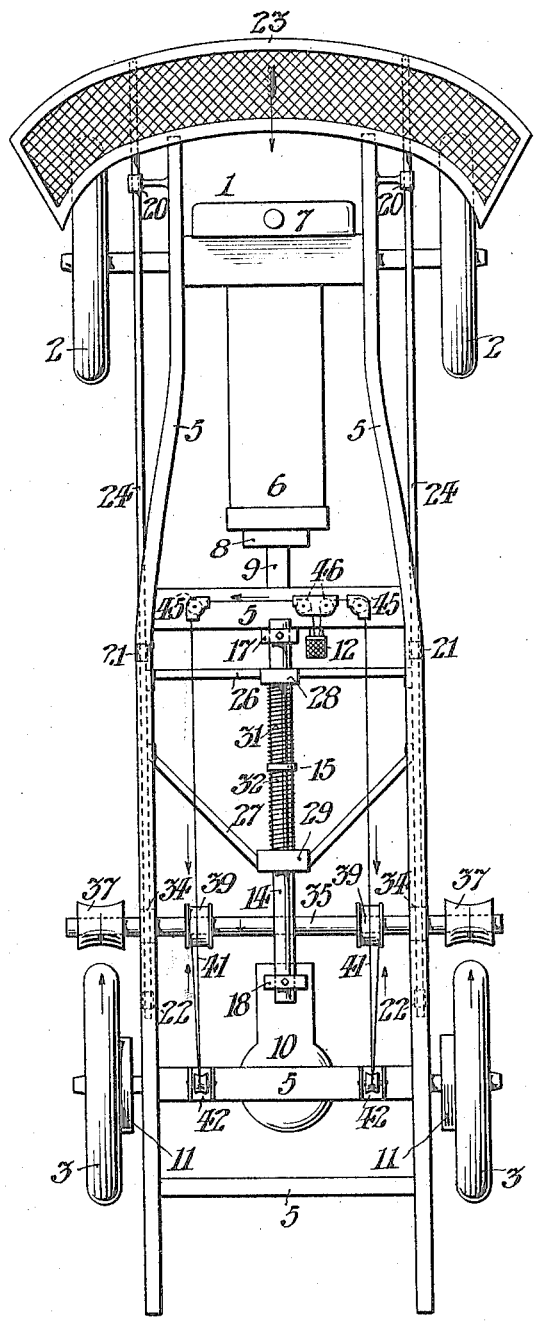

JOHN CAC, OF PHILADELPHIA, PENNSYLVANIA.

AUTOMOBILE.

1,254,575.      Specification of Letters Patent.      Patented Jan. 22, 1918.

Application filed March 23, 1917. Serial No. 157,055.

*To all whom it may concern:*

Be it known that I, JOHN CAC, a citizen of Austria, residing at Philadelphia, in the State of Pennsylvania, have invented a certain new and useful Improvement in Automobiles, whereof the following is a specification, reference being had to the accompanying drawing.

My invention relates to means carried by an automobile, and including a front guard which is movable backward when it encounters an obstacle, to automatically operate a lever whereby the automobile may be controlled. As hereinafter described, the control lever is designed to operate both the clutch of the automobile motor and the brake mechanism; so that the motor is disconnected from the driving wheels and the brakes are applied, automatically, when said guard is thrust rearwardly. In the embodiment of my invention chosen for illustration, said front guard is operatively connected with the control lever by means including a frame which is mounted to slide in the automobile chassis and carries said guard at its front, and also carries a brake shaft having friction wheels adapted to respectively engage the rear wheels of the automobile, to turn said shaft, when said guard is thrust rearwardly to a predetermined extent, and said brake shaft is provided with a winding drum, having a flexible connector extending to said lever, whereby the latter is operated.

My invention includes the various novel features of construction and arrangement hereinafter more definitely specified.

The drawing shows a diagrammatic plan view of an automobile conveniently embodying my invention. In said drawing, the automobile 1 has front wheels 2 and rear wheels 3, and its chassis 5 supports the usual power equipment, including the motor 6, radiator 7, clutch 8, tail shaft 9, differential mechanism 10, brakes 11 and control lever 12. Said chassis is also provided with the stationary bearing bar 14 having the abutment collar 15 and extending parallel with and above said tail shaft 9. Said bearing bar 14 is secured at its respectively opposite ends in the front bearing 17 and rear bearing 18, the latter being conveniently mounted on the casing of the differential mechanism 10.

Said chassis 5 is also provided with slide bearings 20, 21 and 22 in which is mounted the slide frame which carries the front guard 23. Said slide frame comprises the opposite side parallel slide bars 24, the front cross bar 26 and the rear cross bar 27 having respective bearings 28 and 29 mounted to slide on said stationary bearing bar 14. The springs 31 and 32 are interposed between said abutment 15 and said frame cross bars 26 and 27 respectively in front of and behind said abutment, whereby said frame is normally resiliently retained at the forward limit of its movement as indicated in said drawing.

Said slide frame is also provided with the opposite alined bearings 34 in which is journaled the brake shaft 35 having friction wheels 37 arranged to respectively engage said rear wheels 3 when said guard 23 is thrust rearwardly to a predetermined extent.

Said brake shaft 35 is also provided with winding drums 39 respectively upon opposite sides of said bearing bar 14, and the cables or other suitable flexible connectors 41 are each secured at one end to one of said drums 39 and at the other end to said control lever 12, and extend rearwardly from said drums around the cable sheaves 42, which are journaled on said chassis behind said brake shaft 35 respectively in alinement with said drums, and thence around the front cable sheaves 45 and 46 which are journaled on said chassis in front of said control lever 12.

It is to be understood that said control lever 12 is operatively connected with said motor clutch 8 and wheel brakes 11, by any suitable means, so that when said lever 12 is shifted forwardly the automobile will be stopped.

Therefore, it is to be understood that when said front guard 23 encounters an obstacle causing it to be thrust rearwardly with respect to said chassis 5 to the extent predetermined by the space between said friction wheels 37 and the automobile supporting wheels 3, said wheels are frictionally engaged to turn the brake shaft 35 in the direction of the arrow marked thereon, thereby wind said flexible connectors 41 upon said drums 39; whereby said lever 12 is shifted forwardly to stop the automobile, when said front guard is thrust rearwardly.

I do not desire to limit myself to the precise details of construction and arrangement herein set forth, as it is obvious that various modifications may be made therein without departing from the essential features of my invention as defined in the appended claims.

I claim:

1. In an automobile, having front and rear wheels, the combination with a chassis having a motor, tail shaft, clutch, brakes, control lever, stationary bearing bar with an abutment collar, and slide bearings; of a slide frame having slide bars mounted in said slide bearings, cross bars with bearings respectively in front of and behind said abutment, and opposite alined bearings for a brake shaft, and a front guard carried by said slide bars; springs interposed between said abutment and said frame cross bars, respectively in front of and behind said abutment, whereby said frame is normally resiliently retained at the forward limit of its movement; a brake shaft journaled in said alined bearings in said slide frame; friction wheels on said brake shaft, arranged to respectively engage said rear wheels when said guard is thrust rearwardly to a predetermined extent; winding drums on said brake shaft, respectively upon opposite sides of said bearing bar; cable sheaves journaled on said chassis behind said brake shaft, respectively in alinement with said drums; cable sheaves on said chassis in front of said control lever; cables, each secured at one end to one of said drums and at the other end to said control lever, and extending rearwardly from said drums around said rear sheaves, and thence around said front sheaves, to said lever; whereby said lever is shifted forwardly, to stop the automobile, when said front guard is thrust rearwardly.

2. In an automobile, the combination with a chassis having a motor, tail shaft, clutch, brakes, control lever, stationary bearing bar with an abutment, and slide bearings; of a slide frame mounted in said slide bearings, and having bearings, on said bar, respectively in front of and behind said abutment, opposite alined bearings for a brake shaft, and carrying a front guard; springs interposed between said abutment and said frame, respectively in front of and behind said abutment, whereby said frame is normally resiliently retained at the forward limit of its movement; a brake shaft journaled in said alined bearings in said slide frame; friction wheels on said brake shaft, arranged to respectively engage supporting wheels of said automobile when said guard is thrust rearwardly to a predetermined extent; winding drums on said brake shaft; rear cable sheaves on said chassis; front cable sheaves on said chassis; cables respectively connecting said drums with said control lever, and extending from said drums around said rear sheaves, and thence around said front sheaves, to said lever; whereby said lever is automatically shifted to stop the automobile, when said front guard is thrust rearwardly.

3. In an automobile, the combination with a chassis having a motor, control lever, a stationary abutment, and slide bearings; of a slide frame mounted in said slide bearings, having opposite alined bearings for a brake shaft, and carrying a front guard; springs interposed between said abutment and said frame, respectively in front of and behind said abutment, whereby said frame is normally resiliently retained at the forward limit of its movement; a brake shaft journaled in said alined bearings in said slide frame; a wheel on said brake shaft, arranged to turn said shaft, by engagement with a supporting wheel of said automobile, when said guard is thrust rearwardly to a predetermined extent; a winding drum on said brake shaft; and a cable connecting said drum to said control lever; whereby said lever is automatically shifted to stop the automobile, when said front guard is thrust rearwardly.

4. In an automobile, the combination with a chassis having a motor, control lever, and slide bearings; of a slide frame mounted in said slide bearings, and carrying a front guard; a brake shaft journaled in said slide frame; a wheel on said brake shaft, arranged to turn said shaft, by engagement with a supporting wheel of said automobile, when said guard is thrust rearwardly to a predetermined extent; a winding drum on said brake shaft; and a flexible connector from said drum to said control lever; whereby said lever is automatically shifted to stop the automobile, when said front guard is thrust rearwardly.

5. In an automobile, the combination with a chassis having a motor, control lever, and slide bearings; of a slide frame mounted in said slide bearings, and carrying a front guard; a wheel on said frame arranged to engage a supporting wheel of said automobile, when said guard is thrust rearwardly to a predetermined extent; and means operatively connecting said wheel with said lever; whereby said lever is automatically shifted to stop the automobile, when said front guard is thrust rearwardly.

In testimony whereof, I have hereunto signed my name at Philadelphia, Pennsylvania, this 26th day of February, 1917.

JOHN CAC.

Witnesses:
TELICH FRANZ,
ANNA ISRAELVITZ.

Copies of this patent may be obtained for five cents each, by addressing the "Commissioner of Patents, Washington, D. C."